United States Patent
Lee et al.

(10) Patent No.: US 11,529,877 B2
(45) Date of Patent: Dec. 20, 2022

(54) CONTROL METHOD OF VEHICLE HANDLING

(71) Applicants: Hyundai Motor Company, Seoul (KR); Kia Motors Corporation, Seoul (KR)

(72) Inventors: Ho Wook Lee, Seoul (KR); Sangwook Han, Seoul (KR); Jae Chang Kook, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 151 days.

(21) Appl. No.: 17/202,629

(22) Filed: Mar. 16, 2021

(65) Prior Publication Data

US 2022/0105811 A1 Apr. 7, 2022

(30) Foreign Application Priority Data

Oct. 7, 2020 (KR) .................. 10-2020-0129345

(51) Int. Cl.
*B60L 15/20* (2006.01)
*B60L 7/10* (2006.01)

(52) U.S. Cl.
CPC .............. *B60L 15/20* (2013.01); *B60L 7/10* (2013.01); *B60L 2220/42* (2013.01); *B60L 2240/24* (2013.01); *B60L 2240/423* (2013.01)

(58) Field of Classification Search
CPC ........ B60L 15/20; B60L 15/2036; B60L 7/10; B60L 7/18; B60L 2220/42; B60L 2240/24; B60L 2240/423; B60L 2250/28; B60L 3/106; Y02T 10/64; Y02T 10/72; B60W 10/20; B60W 10/08; B60W 30/02; B60W 30/18127; B60W 50/10; B60W 2510/207; B60W 2540/10; B60W 2710/083; B60K 26/021; B60T 13/74; B60T 2270/60;

(Continued)

(56) References Cited

U.S. PATENT DOCUMENTS 8,504,238 B2 * 8/2013 Yu .................... B60K 6/448
701/29.2

FOREIGN PATENT DOCUMENTS

DE 19733674 A1 * 2/1999 ............ B60K 28/16
DE 102011007569 A1 * 11/2011 ............ B60K 6/48

(Continued)

OTHER PUBLICATIONS

Mutah et al.; Cornering Control Method for Front-and-Rear-Wheel-Independent-Drive-Type Electric Vehicle (FRID EV) on Roads with Low Friction Coefficients; 2012 IEEE Vehicle Power and Propulsion Conference, Oct. 9-12, 2012, Seoul, Korea (Year: 2012).*

(Continued)

*Primary Examiner* — Michael J Zanelli
(74) *Attorney, Agent, or Firm* — Slater Matsil, LLP

(57) ABSTRACT

A control method of vehicle handling includes determining that a driving state of a vehicle is an understeer state from an electronic stability control, determining a position of an accelerator from an accelerator position sensor in response to determining that the driving state of the vehicle is the understeer state, and controlling a motor torque of a front wheel side of the vehicle to be smaller than a motor torque of a rear wheel side of the vehicle according to the position of the accelerator.

20 Claims, 8 Drawing Sheets

(58) Field of Classification Search
CPC .. B62D 5/046; B62D 6/08; B60Y 2300/0223; B60Y 2300/0227; B60Y 2300/18125
See application file for complete search history.

(56) References Cited

FOREIGN PATENT DOCUMENTS

JP          3853907 B2  * 12/2006
KR      20140062355 A   *  5/2014

OTHER PUBLICATIONS

Bucchi et al.; The effect of the front-to-rear wheel torque distribution on vehicle handling: An experimental assessment; The Dynamics of Vehicles on Roads and Tracks—Spiryagin et al. (Eds) (Year: 2018).*
Diez et al.; Front/Rear Axle Torque Vectoring Control for Electric Vehicles; Journal of Dynamic Systems, Measurement, and Control Jun. 2019, vol. 141 (Year: 2019).*
Novellis et al.; Torque Vectoring for Electric Vehicles with Individually Controlled Motors: State-of-the-Art and Future Developments; World Electric Vehicle Journal vol. 5, Los Angeles, California, May 6-9, 2012 (Year: 2012).*
Siampis et al.; Front-to-rear torque vectoring Model Predictive Control for terminal understeer mitigation; The Dynamics of Vehicles on Roads and Tracks—Rosenberger et al. (Eds) (Year: 2016).*

* cited by examiner

CONTROL METHOD OF VEHICLE HANDLING

CROSS-REFERENCE TO RELATED APPLICATIONS

This application claims the benefit of Korean Patent Application No. 10-2020-0129345, filed in the Korean Intellectual Property Office on Oct. 7, 2020, which application is hereby incorporated herein by reference.

TECHNICAL FIELD

The present invention relates to a control method of vehicle handling.

BACKGROUND

In terms of vehicle handling performance, when cornering, a rear-wheel drive vehicle generally has an oversteer characteristic, and a front-wheel drive vehicle has an understeer characteristic. In order to improve the handling characteristics of such a vehicle, various technologies for improving handling performance, such as geometry design of a suspension and weight distribution of a vehicle, have been designed with great consideration.

When the layout is decided after the design stage, handling characteristics are improved by utilizing sash control technology to improve handling characteristics. A typical method of improving handling performance using a control technology is a torque vectoring control technology. Conventional torque vectoring technology of an internal combustion engine vehicle controls characteristics of understeer or oversteer by dissipating power of one wheel using a brake during rotation. In this control method, since the control is performed by the operation of the brake, power loss is necessarily accompanied, which causes a decrease in power efficiency. In addition, since the power generated from one engine is distributed to the front and rear wheels, the power of the four wheels cannot be controlled. In addition, as the magnitude of the force to be controlled is controlled through a mechanical system of several stages of hydraulic pressure, brake friction, and actuation force, there are limitations in control response speed, precision, and linearity, making it difficult to perform a desired degree of control.

The above information disclosed in this Background section is only for enhancement of understanding of the background of the invention, and therefore it may contain information that does not form the prior art that is already known to a person of ordinary skill in the art.

SUMMARY

The present invention relates to a control method of vehicle handling. Particular embodiments relate to a control method of vehicle handling for improving the handling performance of vehicles with motors on the front and rear wheel axles.

Embodiments of the present invention provide a control method of vehicle handling without power loss in a vehicle having a motor on the front/rear wheel axle by using characteristics such as fast response, precision, and linearity of the motor.

A control method of vehicle handling according to an exemplary embodiment of the present invention includes determining, by a controller, whether a driving state of the vehicle is an understeer state or an oversteer state from an electronic stability control (ESC), determining, by the controller, the driver's willingness to accelerate from an accelerator position sensor (APS) if it is determined that the driving state of the vehicle is an understeer state, and controlling, by the controller, a motor torque of a front wheel side of the vehicle to be smaller than a motor torque of a rear wheel side of the vehicle according to the driver's willingness to accelerate.

The control method of vehicle handling according to an exemplary embodiment of the present invention may further include reducing, by the controller, a motor torque of the front wheel side of the vehicle and increasing a motor torque of the rear wheel side of the vehicle if it is determined that the driver's willingness to accelerate is constant.

The control method of vehicle handling according to an exemplary embodiment of the present invention may further include reducing, by the controller, a motor torque of the front wheel side of the vehicle if it is determined that the driver's willingness to accelerate is deceleration.

The control method of vehicle handling according to an exemplary embodiment of the present invention may further include determining, by the controller, whether the current torque of the vehicle is less than the available motor torque if it is determined that the driver's willingness to accelerate is acceleration, increasing, by the controller, the motor torque of the rear wheel side of the vehicle if it is determined that the current torque of the vehicle is less than the available motor torque, and reducing, by the controller, a motor torque of the front wheel side of the vehicle if it is determined that the current torque of the vehicle is greater than or equal to the available motor torque.

A control method of vehicle handling according to another exemplary embodiment of the present invention includes determining, by a controller, whether a driving state of the vehicle is an understeer state or an oversteer state from an ESC, determining, by the controller, the driver's willingness to accelerate from an APS if it is determined that the driving state of the vehicle is an oversteer state, and controlling, by the controller, a motor torque of a front wheel side of the vehicle to be larger than a motor torque of a rear wheel side of the vehicle according to the driver's willingness to accelerate.

The control method of vehicle handling according to another exemplary embodiment of the present invention may further include increasing, by the controller, a motor torque of the front wheel side of the vehicle and reducing a motor torque of the rear wheel side of the vehicle if it is determined that the driver's willingness to accelerate is constant.

The control method of vehicle handling according to another exemplary embodiment of the present invention may further include reducing, by the controller, a motor torque of the rear wheel side of the vehicle if it is determined that the driver's willingness to accelerate is deceleration.

The control method of vehicle handling according to another exemplary embodiment of the present invention may further include determining, by the controller, whether the current torque of the vehicle is less than the available motor torque if it is determined that the driver's willingness to accelerate is acceleration, increasing, by the controller, the motor torque of the front wheel side of the vehicle if it is determined that the current torque of the vehicle is less than the available motor torque, and reducing, by the controller, a motor torque of the rear wheel side of the vehicle if it is determined that the current torque of the vehicle is greater than or equal to the available motor torque.

The motor torque of the front wheel side and the motor torque of the rear wheel side of the vehicle may be set to have a driving force of 0 to 100% or less.

When the motor torque of the front wheel side and the motor torque of the rear wheel side of the vehicle are set to have a driving force of 0%, the torque may be reduced through regenerative braking.

As described above, according to embodiments of the present invention, in vehicles with motors on the front/rear wheel axles that are not internal combustion engines, by controlling the motor driving force of the front/rear wheel and the motor driving force according to the driver's willingness to accelerate, it is possible to improve the handling characteristics of the vehicle by removing understeer and oversteer.

In addition, it is possible to improve handling performance without loss of power by using characteristics such as fast response, precision, and linearity of the motor.

DETAILED DESCRIPTION OF ILLUSTRATIVE EMBODIMENTS

Figure 1:
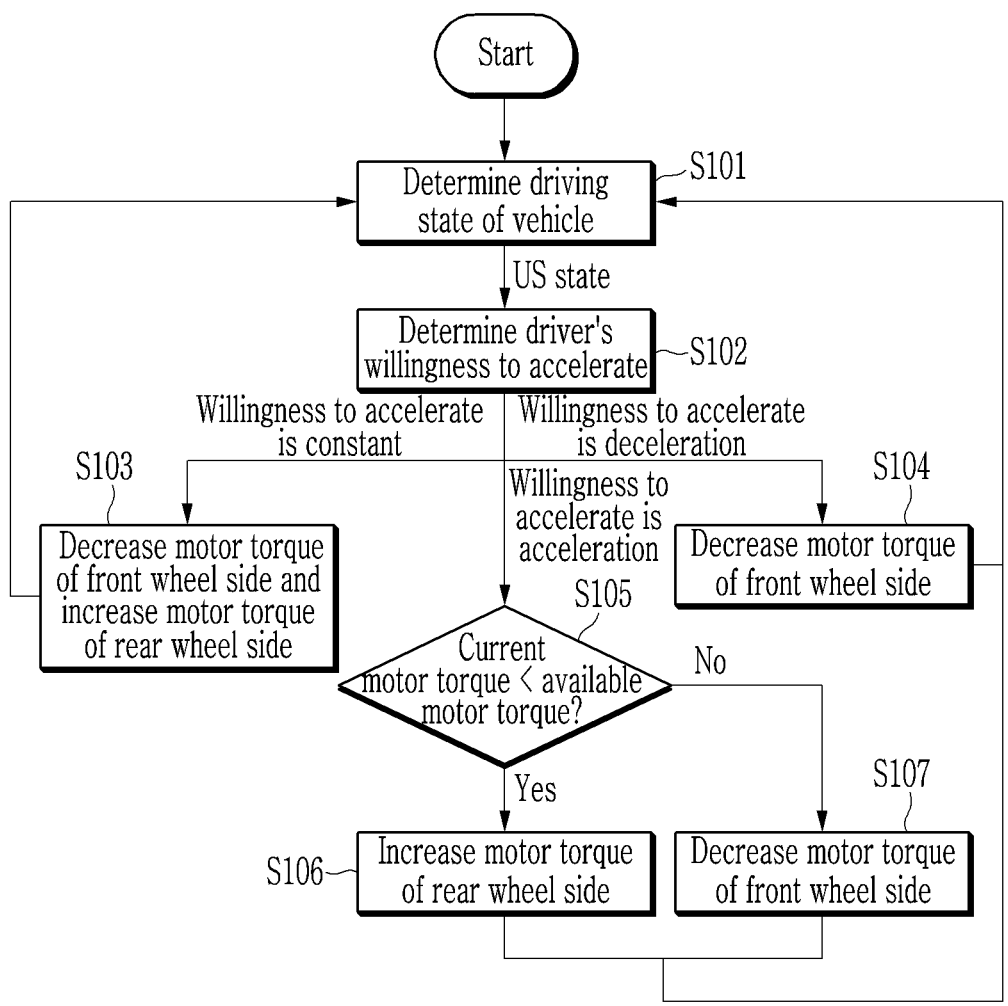
FIG. 1 is a flowchart illustrating a control method of vehicle handling according to an exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The first exemplary embodiment of the present invention shows an exemplary embodiment of the present invention in detail. As a result, various modifications of the drawings will be expected. Therefore, the first exemplary embodiment is not limited to a specific aspect of the illustrated region, and for example, includes modifications of an aspect by manufacturing.

Now, a control method of vehicle handling according to an exemplary embodiment of the present invention will be described with reference to the attached drawings.

FIG. 1 is a flowchart illustrating a control method of vehicle handling according to an exemplary embodiment of the present invention.

Referring to FIG. 1, firstly, it is determined, by a controller, whether a driving state of the vehicle is an understeer state or an oversteer state from an electronic stability control (ESC) S101.

In this case, the controller may be implemented by one or more processors operating according to a set program, and the set program may be programmed to perform each step of the after-blow control method of a vehicle air conditioner according to an exemplary embodiment of the present invention.

When the driving state of the vehicle is understeered, the cornering radius becomes larger than the angle at which the steering wheel is bent during cornering of the vehicle, and when the driving state of the vehicle is oversteered, the cornering radius is vice versa. The driving state of the vehicle is detected by a vehicle body attitude control device provided in the vehicle, and a detection signal is transmitted to the controller.

The ESC is an electronic device for stable driving of a vehicle, and includes a sensor that detects the number of wheel rotations. The sensor that recognizes the difference in the rotational force of both wheels can correct the vehicle body by balancing the two sides by reducing the speed on the wheel with high rotational speed and increasing the speed on the low rotational speed. The signal from the rotational speed sensor of the ESC is transmitted to the controller, so that the controller may determine whether the current driving state of the vehicle is an understeer state or an oversteer state.

Then, it is determined, by the controller, the driver's intent (or willingness) to accelerate from an accelerator position sensor (APS) if it is determined that the driving state of the vehicle is an understeer state (US state) S102.

The APS is a sensor that controls the engine output and improves steering performance when turning the vehicle by transmitting the degree to which the driver depresses the accelerator pedal as an electrical signal (voltage). The controller determines the driver's willingness, i.e., whether the driver desires to accelerate, to decelerate, or to maintain a constant speed state, by an electric signal from the accelerator pedal position sensor.

Then, the controller controls a motor torque of a front wheel side of the vehicle to be smaller than a motor torque of a rear wheel side of the vehicle according to the driver's willingness to accelerate (S103-S107). In other words, in the case of understeer, the cornering radius becomes larger than the angle at which the steering wheel is bent when the vehicle is cornering, so by controlling the motor torque on the rear wheel side of the vehicle to be relatively larger than the motor torque on the front wheel side, reducing the cornering radius by increasing the turning force of the vehicle, the cornering of the vehicle can be controlled to correspond to the angle of the steering wheel bent.

At this time, if it is determined that the driver's willingness to accelerate is constant, the controller may decrease the driving force of the front wheel by reducing the motor torque of the front wheel of the vehicle, and increase the driving force of the rear wheel by increasing the motor torque of the rear wheel of the vehicle S103.

Figure 5:
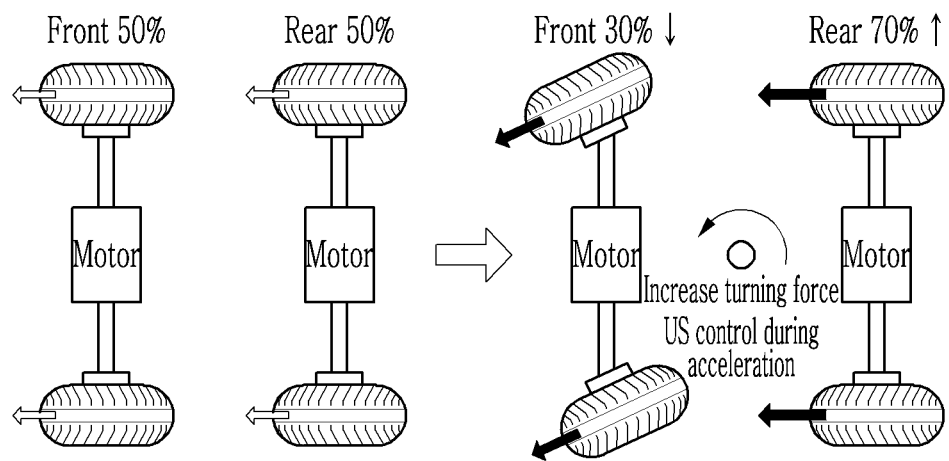
FIG. 5 is a diagram illustrating an example of a handling control according to a motor torque change when the driving force of the front/rear wheels is 50% and the driver's willingness to accelerate is constant in a control method of vehicle handling according to an exemplary embodiment of the present invention.

FIG. 5 is a diagram illustrating an example of a handling control according to a motor torque change when the driving force of the front/rear wheels is 50% and the driver's willingness to accelerate is constant in a control method of vehicle handling according to an exemplary embodiment of the present invention.

As shown in FIG. 5, when the driving force of the front and rear wheels is the same at 50% and the vehicle is at constant speed, the driving force of the front wheels is reduced to about 30%, and when the driving force of the rear wheels is increased to about 70%, the turning power of the vehicle increases, thereby improving the understeer phenomenon.

Meanwhile, the controller may reduce only a motor torque of the front wheel side of the vehicle if it is determined that the driver's willingness to accelerate is deceleration S104.

Figure 4:
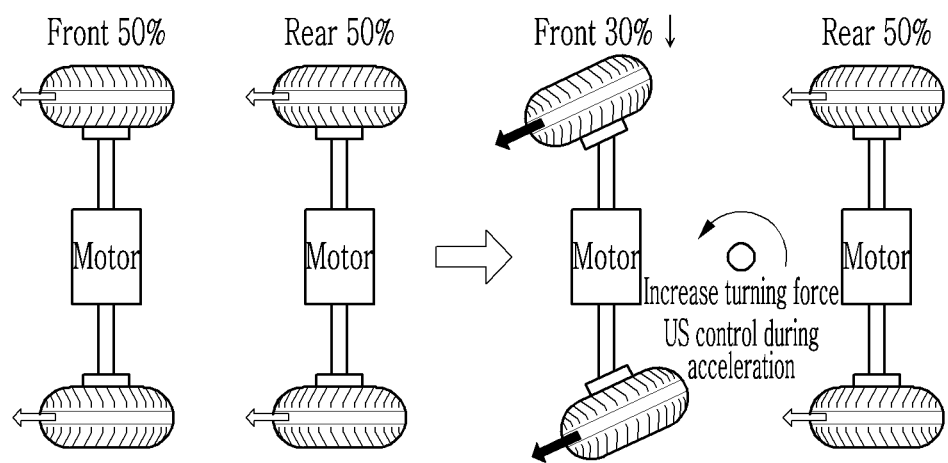
FIG. 4 is a diagram illustrating an example of a handling control according to a motor torque change when the driving force of the front/rear wheels is 50% and the driver's willingness to accelerate is deceleration in a control method of vehicle handling according to an exemplary embodiment of the present invention.

FIG. 4 is a diagram illustrating an example of a handling control according to a motor torque change when the driving force of the front/rear wheels is 50% and the driver's willingness to accelerate is deceleration in a control method of vehicle handling according to an exemplary embodiment of the present invention.

As shown in FIG. 4, if the driving force of the front/rear wheel motors is equal to 50% and the driver shows willingness to decelerate, the driving force of the front wheel is reduced to about 30% without changing the driving force of the rear wheel, and the turning force of the vehicle is increased, thereby improving the understeer phenomenon.

Meanwhile, if it is determined that the driver's willingness to accelerate is acceleration, the controller may increase only the motor torque of the rear wheel side of the vehicle or only the motor torque of the front wheel side according to the current motor torque and the available motor torque.

Figure 3:
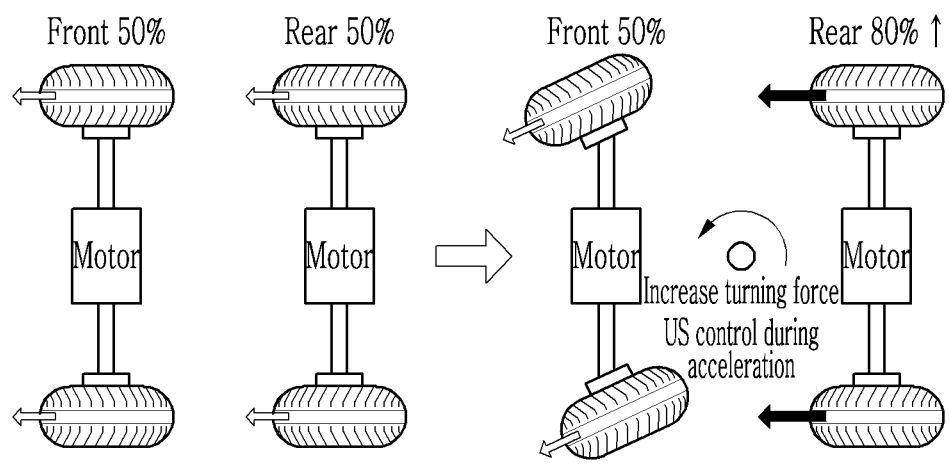
FIG. 3 is a diagram illustrating an example of a handling control according to a motor torque change when the driving force of the front/rear wheels is 50% and the driver's willingness to accelerate is acceleration in a control method of vehicle handling according to an exemplary embodiment of the present invention.

FIG. 3 is a diagram illustrating an example of a handling control according to a motor torque change when the driving force of the front/rear wheels is 50% and the driver's willingness to accelerate is acceleration in a control method of vehicle handling according to an exemplary embodiment of the present invention.

As shown in FIG. 3, if the driving force of the front/rear wheel motor is equal to 50% and the driver shows a willingness to accelerate, since the current torque (50%) is less than the available motor torque (100%), if the driving force of the front wheel is not changed and the driving force of the rear wheel is increased to about 80%, the turning force of the vehicle is increased and the understeer phenomenon can be improved.

That is, if it is determined that the driver's willingness to accelerate is acceleration, the controller determines whether the current torque of the vehicle is less than the available motor torque S105. If it is determined that the current torque of the vehicle is less than the available motor torque, the controller increases the motor torque of the rear wheel side of the vehicle S106, and if it is determined that the current torque of the vehicle is greater than or equal to the available motor torque, the controller reduces a motor torque of the front wheel side of the vehicle S107. In case of FIG. 3, as described above, since the current torque of the vehicle has a torque of 50% less than the available motor torque (100%), the controller can control the handling by increasing only the motor torque on the rear wheel side of the vehicle.

Figure 2:
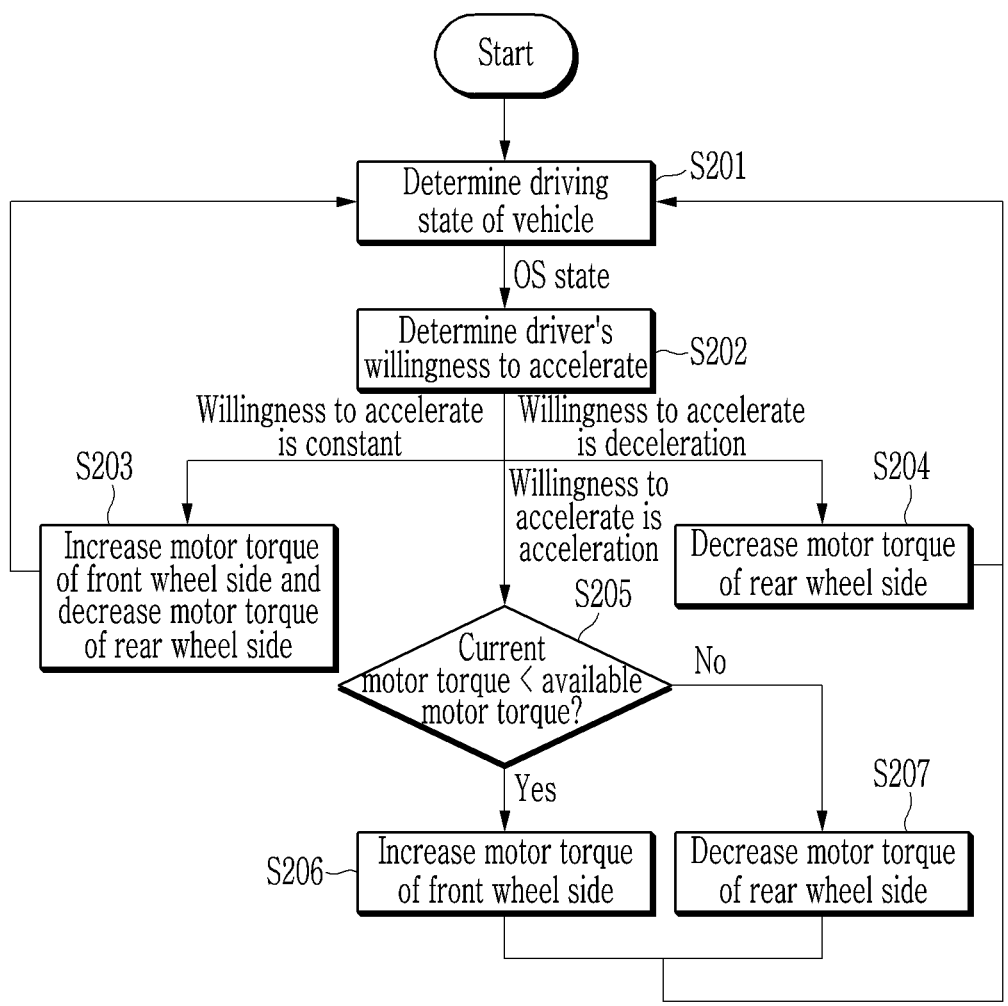
FIG. 2 is a flowchart illustrating a control method of vehicle handling according to another exemplary embodiment of the present invention.

FIG. 2 is a flowchart illustrating a control method of vehicle handling according to another exemplary embodiment of the present invention.

Referring to FIG. 2, firstly, it is determined, by a controller, whether a driving state of the vehicle is an understeer state or an oversteer state from an ESC S201. The driving state of the vehicle is detected by the ESC, and a detection signal is transmitted to the controller.

Then, if it is determined that the driving state of the vehicle is an oversteer state (OS state), the controller determines the driver's willingness to accelerate from an APS S202.

Then, the controller controls a motor torque of a front wheel side of the vehicle to be larger than a motor torque of a rear wheel side of the vehicle according to the driver's willingness to accelerate. That is, in the oversteer state, the cornering radius is smaller than the angle at which the steering wheel is bent when the vehicle is cornering. Accordingly, by controlling the motor torque on the front wheel side of the vehicle to be relatively larger than the motor torque on the rear wheel side, thereby reducing the turning force by increasing the cornering radius, the cornering of the vehicle may be controlled to correspond to the angle at which the steering wheel is bent.

At this time, if it is determined that the driver's willingness to accelerate is constant, the controller increases a motor torque of the front wheel side of the vehicle to increase driving force of the front wheel and reduces a motor torque of the rear wheel side of the vehicle to reduce driving force of the rear wheel S203.

Meanwhile, if it is determined that the driver's willingness to accelerate is deceleration, the controller reduces only a motor torque of the rear wheel side of the vehicle S204. It is possible to improve the oversteer phenomenon by reducing the turning force of the vehicle while only reducing the driving force of the rear wheel without changing the driving force of the front wheel.

Meanwhile, if it is determined that the driver's willingness to accelerate is acceleration, the controller determines whether the current torque of the vehicle is less than the available motor torque S205. If it is determined that the current torque of the vehicle is less than the available motor torque, the controller increases the motor torque of the front wheel side of the vehicle S206, and if it is determined that the current torque of the vehicle is greater than or equal to the available motor torque, the controller reduces a motor torque of the rear wheel side of the vehicle S207.

Figure 6:
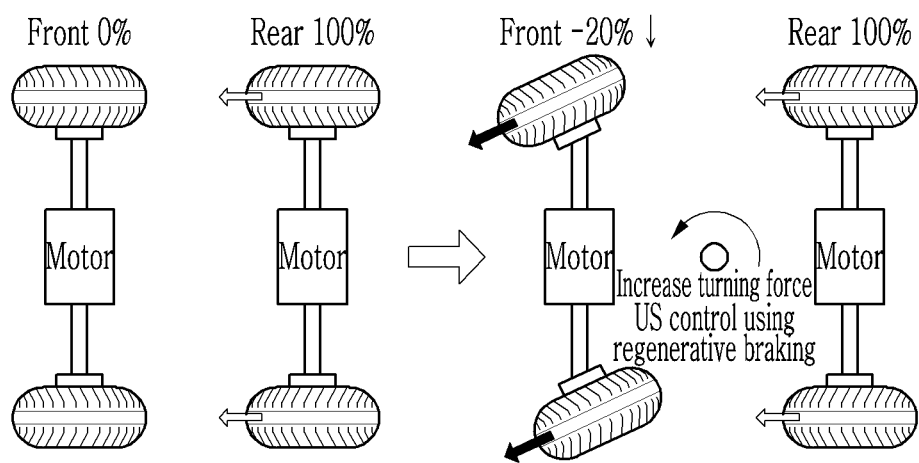
FIG. 6 is a diagram illustrating an example of a handling control according to a motor torque change when the driving force of the front wheel is 0%, the driving force of the rear wheel is 100%, and the driver's willingness to accelerate is deceleration in a control method of vehicle handling according to an exemplary embodiment of the present invention.
Figure 7:
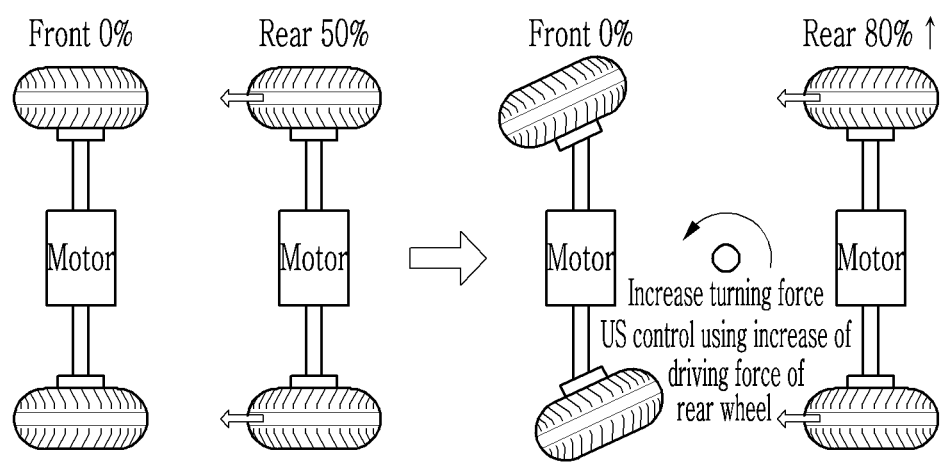
FIG. 7 is a diagram illustrating an example of a handling control according to a motor torque change when the driving force of the front wheel is 0%, the driving force of the rear wheel is 50%, and the driver's willingness to accelerate is acceleration in a control method of vehicle handling according to an exemplary embodiment of the present invention.
Figure 8:
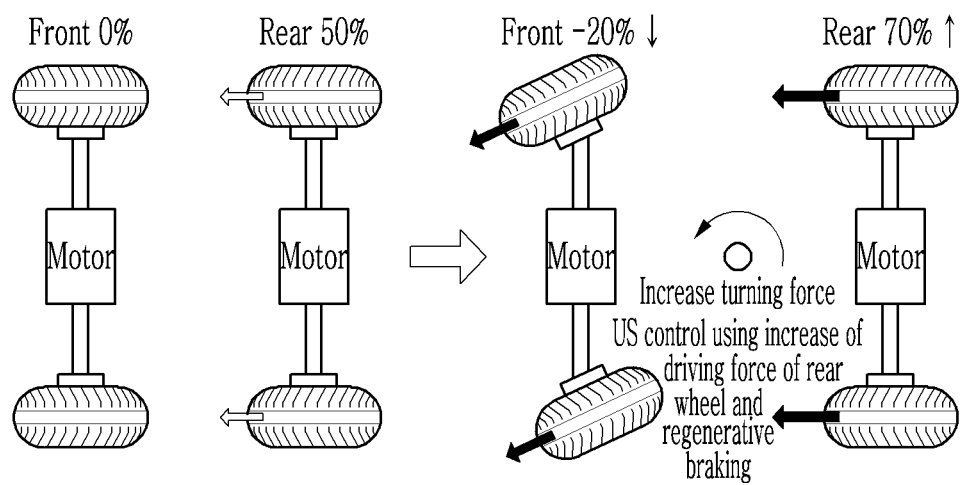
FIG. 8 is a diagram illustrating an example of a handling control according to a motor torque change when the driving force of the front wheel is 0%, the driving force of the rear wheel is 50%, and the driver's willingness to accelerate is constant in a control method of vehicle handling according to an exemplary embodiment of the present invention.

Meanwhile, as shown in FIG. 3 to FIG. 8, the motor torque of the front wheel side and the motor torque of the rear wheel side of the vehicle may be set to have a driving force of 0 to 100% or less, the motor torque of the front wheel and the rear wheel may be set equally to 50% (FIG. 3 to FIG. 5), only the motor torque of the rear wheel may be set to 100% (FIG. 6), or only the motor torque of the rear wheel may be set to 50% (FIG. 7 and FIG. 8).

Meanwhile, when the motor torque of the front wheel side and the motor torque of the rear wheel side of the vehicle are set to have a driving force of 0%, the torque may be reduced through regenerative braking. That is, as shown in FIG. 6, when driving force of the front wheel is 0%, the driving force of the rear wheel is 100%, and the driver's willingness to accelerate is deceleration. In order to improve the understeer phenomenon, it is necessary to reduce the motor torque of the front wheel side, and at this time, only the driving force of the front wheel can reduce the torque by using the regenerative braking of the motor. Regenerative braking is widely known in the industry as a braking method in which electric power generated by using a motor as a generator is returned to the power source.

In addition, as shown in FIG. 7, if the driving force of the front wheel is 0%, the driving force of the rear wheel is 50%, and the driver's willingness to accelerate is acceleration, the driving force of the front wheel is not changed, and if the driving force of the rear wheel is increased to about 80%, the turning force of the vehicle increases, thereby improving the understeer phenomenon.

In addition, as shown in FIG. 8, when the driving force of the front wheel is 0%, the driving force of the rear wheel is 50%, and the driver's willingness to accelerate is constant, in order to improve the understeer phenomenon, the motor torque of the front wheel side can increase the turning force by reducing the driving force of the front wheel to about −20% by regenerative braking, and increasing the driving force of the rear wheel to about 70%.

Like this, in vehicles with motors on the front/rear wheel axles, by controlling the motor driving force of the front/rear wheel and the motor driving force according to the driver's willingness to accelerate, it is possible to improve the handling characteristics of the vehicle by removing understeer and oversteer.

In addition, it is possible to improve handling performance without loss of power by using characteristics such as fast response, precision, and linearity of the motor.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A control method of vehicle handling, the control method comprising:
   determining that a driving state of a vehicle is an understeer state from an electronic stability control;
   determining a position of an accelerator from an accelerator position sensor in response to determining that the driving state of the vehicle is the understeer state; and
   controlling a motor torque of a front wheel side of the vehicle to be smaller than a motor torque of a rear wheel side of the vehicle according to the position of the accelerator.

2. The control method of claim 1, further comprising reducing the motor torque of the front wheel side of the vehicle and increasing the motor torque of the rear wheel side of the vehicle when the position of the accelerator indicates the vehicle is to remain at the same speed.

3. The control method of claim 1, further comprising reducing the motor torque of the front wheel side of the vehicle when the position of the accelerator indicates the vehicle is to decelerate.

4. The control method of claim 1, further comprising:
   determining whether a current torque of the vehicle is less than an available motor torque when the position of the accelerator indicates the vehicle is to accelerate; and
   increasing the motor torque of the rear wheel side of the vehicle when it is determined that the current torque of the vehicle is less than the available motor torque.

5. The control method of claim 1, further comprising:
   determining whether a current torque of the vehicle is less than an available motor torque when the position of the accelerator indicates the vehicle is to accelerate; and
   reducing the motor torque of the front wheel side of the vehicle when it is determined that the current torque of the vehicle is greater than or equal to the available motor torque.

6. The control method of claim 1, wherein the motor torque of the front wheel side and the motor torque of the rear wheel side of the vehicle are set to have a driving force of 0 to 100% or less.

7. The control method of claim 6, wherein, when the motor torque of the front wheel side and the motor torque of the rear wheel side of the vehicle are set to have a driving force of 0%, the motor torque of each is reduced through regenerative braking.

8. A control method of vehicle handling, the control method comprising:
   determining that a driving state of a vehicle is an oversteer state from an electronic stability control;
   determining a position of an accelerator from an accelerator position sensor in response to determining that the driving state of the vehicle is the oversteer state; and
   controlling a motor torque of a front wheel side of the vehicle to be larger than a motor torque of a rear wheel side of the vehicle according to the position of the accelerator.

9. The control method of claim 8, further comprising increasing the motor torque of the front wheel side of the vehicle and reducing the motor torque of the rear wheel side of the vehicle when the position of the accelerator indicates the vehicle is to remain at a same speed.

10. The control method of claim 8, further comprising reducing the motor torque of the rear wheel side of the vehicle when the position of the accelerator indicates the vehicle is to decelerate.

11. The control method of claim 8, further comprising:
    determining whether a current torque of the vehicle is less than an available motor torque when the position of the accelerator indicates the vehicle is to accelerate; and
    increasing the motor torque of the front wheel side of the vehicle when it is determined that the current torque of the vehicle is less than the available motor torque.

12. The control method of claim 8, further comprising:
determining whether a current torque of the vehicle is less than an available motor torque when the position of the accelerator indicates the vehicle is to accelerate; and
reducing the motor torque of the rear wheel side of the vehicle when it is determined that the current torque of the vehicle is greater than or equal to the available motor torque.

13. The control method of claim 8, wherein the motor torque of the front wheel side and the motor torque of the rear wheel side of the vehicle are set to have a driving force of 0 to 100% or less.

14. The control method of claim 13, wherein, when the motor torque of the front wheel side and the motor torque of the rear wheel side of the vehicle are set to have a driving force of 0%, the motor torque of each is reduced through regenerative braking.

15. A control method of vehicle handling, the control method comprising:
determining whether a driving state of a vehicle is an understeer state or an oversteer state;
determining a position of an accelerator from an accelerator position sensor;
controlling a motor torque of a front wheel side of the vehicle to be smaller than a motor torque of a rear wheel side of the vehicle according to the position of the accelerator when the driving state of the vehicle is the understeer state; and
controlling the motor torque of the front wheel side of the vehicle to be larger than the motor torque of the rear wheel side of the vehicle according to the position of the accelerator when the driving state of the vehicle is the oversteer state.

16. The control method of claim 15, wherein the position of the accelerator indicates whether the vehicle is accelerating, decelerating, or staying at a current speed.

17. The control method of claim 16, further comprising:
reducing the motor torque of the front wheel side of the vehicle and increasing the motor torque of the rear wheel side of the vehicle when the driving state of the vehicle is the understeer state and the position of the accelerator indicates the vehicle is staying at the current speed; and
increasing the motor torque of the front wheel side of the vehicle and reducing the motor torque of the rear wheel side of the vehicle when the driving state of the vehicle is the oversteer state and the position of the accelerator indicates the vehicle is staying at the current speed.

18. The control method of claim 16, further comprising:
reducing the motor torque of the front wheel side of the vehicle when the driving state of the vehicle is the understeer state and the position of the accelerator indicates the vehicle is decelerating; and
reducing the motor torque of the rear wheel side of the vehicle when the driving state of the vehicle is the oversteer state and the position of the accelerator indicates the vehicle is decelerating.

19. The control method of claim 16, further comprising:
determining whether a current torque of the vehicle is less than an available motor torque when the position of the accelerator indicates the vehicle is accelerating;
increasing the motor torque of the rear wheel side of the vehicle when it is determined that the current torque of the vehicle is less than the available motor torque and the driving state of the vehicle is the understeer state; and
increasing the motor torque of the front wheel side of the vehicle when it is determined that the current torque of the vehicle is less than the available motor torque and the driving state of the vehicle is the oversteer state.

20. The control method of claim 16, further comprising:
determining whether a current torque of the vehicle is less than an available motor torque when the position of the accelerator indicates the vehicle is accelerating;
reducing the motor torque of the front wheel side of the vehicle when it is determined that the current torque of the vehicle is greater than or equal to the available motor torque and the driving state of the vehicle is the understeer state; and
reducing the motor torque of the rear wheel side of the vehicle when it is determined that the current torque of the vehicle is greater than or equal to the available motor torque and the driving state of the vehicle is the oversteer state.

* * * * *